(12) United States Patent
Langner

(10) Patent No.: US 10,071,810 B1
(45) Date of Patent: Sep. 11, 2018

(54) METHODS AND APPARATUS FOR A PARACHUTE RETAINER

(71) Applicant: F. Richard Langner, Fountain Hills, AZ (US)

(72) Inventor: F. Richard Langner, Fountain Hills, AZ (US)

(*) Notice: Subject to any disclaimer, the term of this patent is extended or adjusted under 35 U.S.C. 154(b) by 0 days.

(21) Appl. No.: 15/876,146

(22) Filed: Jan. 20, 2018

Related U.S. Application Data

(60) Provisional application No. 62/456,971, filed on Feb. 9, 2017.

(51) Int. Cl.
*F42B 10/56* (2006.01)
*F42B 33/06* (2006.01)
*B64D 17/76* (2006.01)
*F41F 1/00* (2006.01)

(52) U.S. Cl.
CPC .............. *B64D 17/76* (2013.01); *F41F 1/00* (2013.01); *F42B 10/56* (2013.01); *F42B 33/067* (2013.01)

(58) Field of Classification Search
CPC .......... F41A 25/00; F41A 25/06; F41A 21/48; F41A 21/484; F41A 21/487; F41A 1/08; F41H 11/12; F42B 33/067; F42B 10/56; F42D 5/04; B64D 17/00
USPC ........... 86/50; 89/42.01, 42.02, 42.03, 43.01, 89/43.02, 44.01, 44.02, 14.3, 40.06, 1.13, 89/37.04, 37.05, 37.01; 42/1.06, 94; 102/402, 403
See application file for complete search history.

(56) References Cited

U.S. PATENT DOCUMENTS

| 4,967,636 A | * | 11/1990 | Murray | F41H 11/14 102/370 |
| 5,134,921 A | * | 8/1992 | Breed | F41A 23/06 86/50 |
| 5,811,716 A | * | 9/1998 | Ellzey | F41A 9/60 232/44 |
| 6,540,186 B1 | * | 4/2003 | Fischer | B64D 17/40 248/205.2 |
| 6,935,065 B1 | * | 8/2005 | Oliver | F41A 23/04 211/64 |
| 8,413,570 B2 | * | 4/2013 | Langner | F42D 5/04 89/42.01 |
| 9,217,613 B2 | * | 12/2015 | Langner | F41A 25/06 |
| 9,488,429 B1 | * | 11/2016 | Langner | F41A 25/26 |
| 9,702,663 B2 | * | 7/2017 | Rabec Le Gloahec | F41G 3/145 |
| 2012/0180644 A1 | * | 7/2012 | Langner | F41A 25/00 89/42.01 |

(Continued)

FOREIGN PATENT DOCUMENTS

| CA | 2269431 A1 | * | 10/1999 | B64D 17/60 |
| DE | 2806842 A1 | * | 8/1979 | F16M 11/10 |

*Primary Examiner* — Jonathan C Weber
(74) *Attorney, Agent, or Firm* — Lawrence Letham; Letham Law Firm LLC

(57) ABSTRACT

Movement of a disrupter cannon is arrested by a parachute. The parachute is coupled (e.g., tethered) to the disrupter cannon. Prior to firing the cannon, the parachute is held in a retainer. Movement of the disrupter cannon in response to firing pulls the parachute from the retainer. The parachute deploys and arrests the movement of the disrupter cannon. The retainer protects the parachute prior to firing the disrupter cannon. The retainer may hold the parachute during transport.

23 Claims, 2 Drawing Sheets

(56) References Cited

U.S. PATENT DOCUMENTS

2014/0245878 A1\* 9/2014 Langner ............... F41A 25/06
  86/50
2014/0245880 A1\* 9/2014 Rabec Le Gloahec ... F41G 3/00
  89/1.13

\* cited by examiner

METHODS AND APPARATUS FOR A PARACHUTE RETAINER

FIELD OF THE INVENTION

Embodiments of the present invention relate to a retainer for holding a parachute of a disrupter cannon prior to activation of the disrupter cannon.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION

Figure 1:
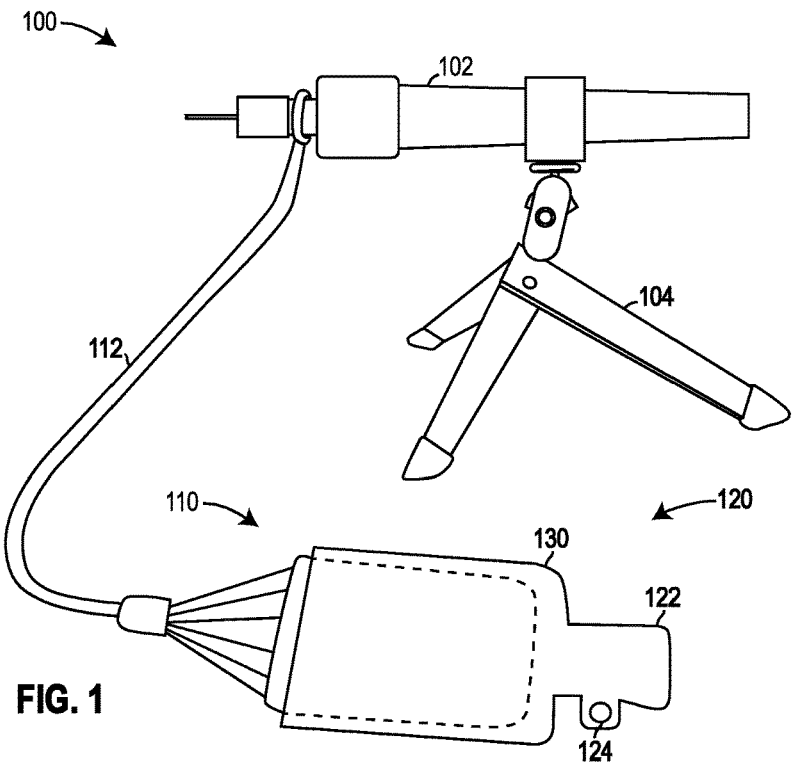
FIG. 1 is a view of a disrupter system prior to firing the disrupter cannon according to various aspects of the present disclosure.

Disrupter cannons are used by military, bomb squad, and other emergency personnel to destroy or disable explosive devices such as an improvised explosive device ("IED"), bombs, and ordinance.

A disrupter cannon launches a projectile toward an explosive device. The projectile impacts and disrupts components within the explosive device to disable or destroy the explosive device or to facilitate personnel to disable or destroy the explosive device.

A disrupter cannon may be held and aimed prior to firing using a mount. The disrupter cannon may be aimed toward the explosive device, so that the projectile launched from the disrupter cannon strikes the explosive device. A mount may include a tripod that has a ring for retaining the barrel of the disrupter cannon. The force of recoil from firing the disrupter cannon to launch the projectile causes the barrel of the disrupter cannon to exit the ring and to travel away from the mount. Movement of the disrupter cannon away from the mount may be used to deploy an aerodynamic brake, such as a parachute, to slow and eventually stop the movement of the disrupter cannon away from the mount.

Proper deployment of the parachute is enhanced by retaining the parachute prior to deployment. A retainer (e.g., bag, pouch, container, sack) holds a parachute in a position that is most likely to result in a proper deployment. A retainer reduces interference of air (e.g., wind) with the parachute that might prematurely deploy the parachute prior to firing the disrupter cannon. A retainer positions a parachute for proper deployment. A retainer may hold a parachute in a folded position. A retainer may hold a parachute in an extended (e.g., deployed) or partially extended position. A retainer may position the parachute relative to the disrupter cannon. A retainer may position the parachute relative to the direction in a force will be applied to extract the parachute from the retainer. A retainer protects the parachute from forces (e.g., wind, explosion, debris, contact by a user) that may disrupt the parachute prior to deployment thereby interfering with proper deployment. A retainer may hold a parachute during transport and/or storage thereby protecting the parachute from damage. A retainer may be held (e.g., affixed attached, weighted, anchored). A retainer may be anchored relative to and/or on an object (e.g., ground, mount, disrupter cannon) prior to deployment. A retainer may be held relative an object during and after deployment of the parachute.

A parachute may be coupled to a disrupter cannon. A lanyard (e.g., cord, rope, string) may couple the parachute to the disrupter cannon. Movement of a disrupter cannon in response to a force of recoil from firing the disrupter cannon may extract (e.g., withdraw, pull) a parachute from a retainer. Movement of the disrupter cannon applies a force on the lanyard. The lanyard transfers the force to the parachute. The force may pull the parachute from the retainer. A force may cause the parachute to cooperate with an inside surface of the retainer to begin deployment (e.g., unfolding, extending) of the parachute. A parachute may further deploy (e.g., open) or deploy responsive solely to air resistance once the parachute is extracted from the retainer.

Once deployed, a parachute applies a force via the lanyard on the disrupter cannon. The force applied by the parachute on the disrupter cannon is in a direction that is different (e.g., opposite) as compared to the force exerted by the disrupter cannon on the parachute. The force applied by the parachute on the disrupter cannon slows (e.g., retards, arrests) movement of the disrupter cannon away from the mount or the location at which the disrupter cannon was fired. A parachute may stop (e.g., halt, arrest), in time, movement of a disrupter cannon. A parachute may limit a distance that a disrupter cannon travels in response to being fired.

Figure 2:
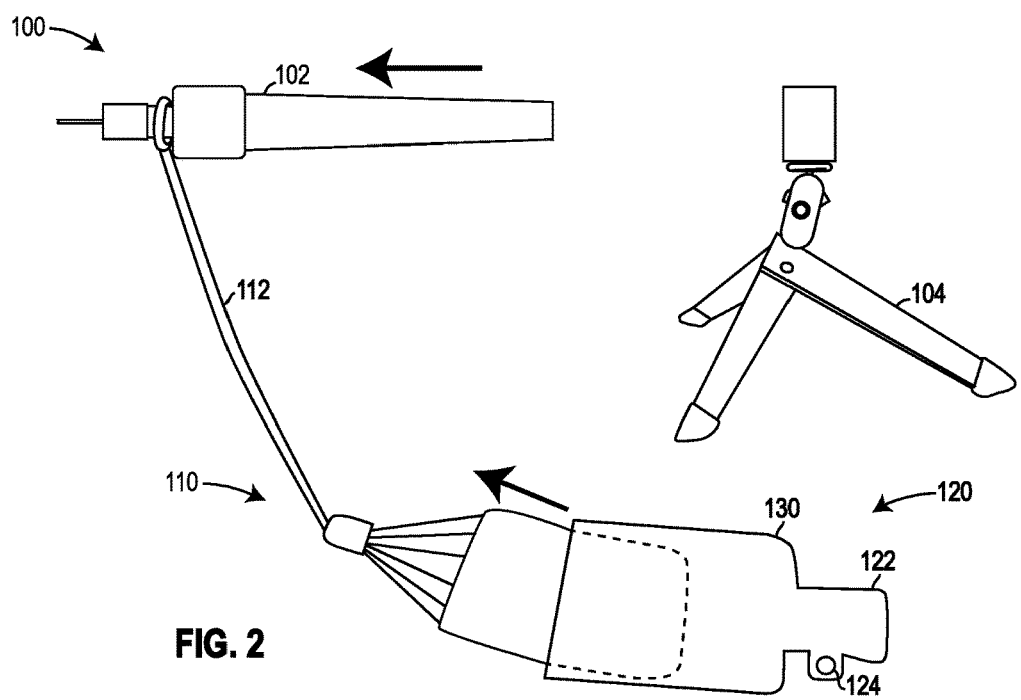
FIG. 2 is a view of the disrupter system of FIG. 1 after firing the disrupter cannon.
Figure 3:
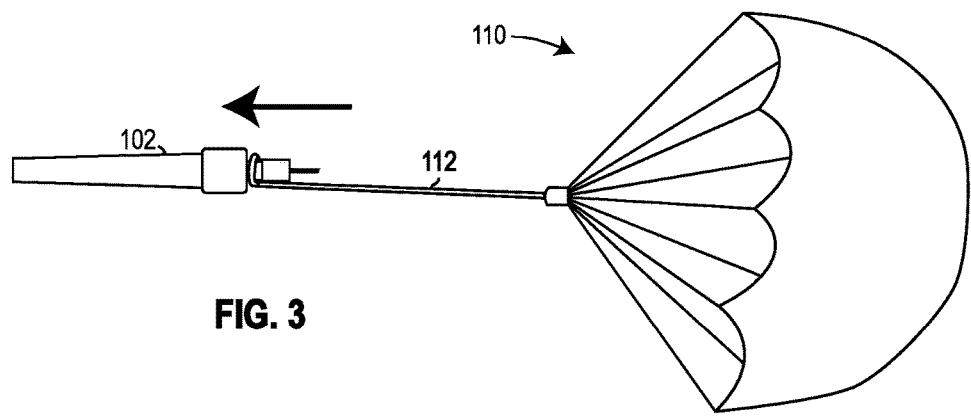
FIG. 3 is a view of the disrupter cannon of FIGS. 1 and 2 coupled to a parachute after the parachute has exited the retainer and deployed.
Figure 4:
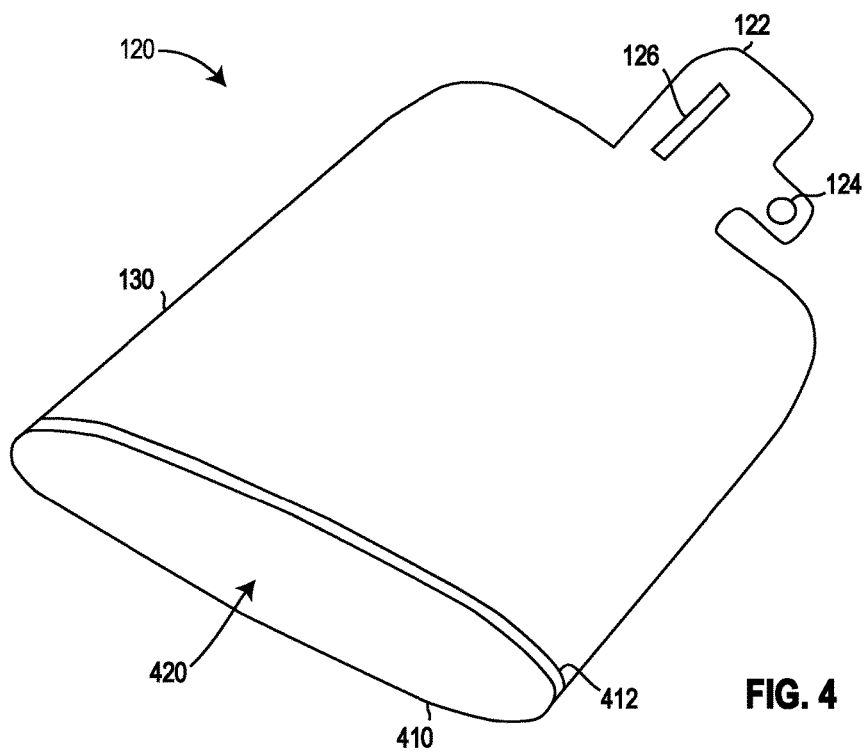
FIG. 4 is a view of an implementation of the retainer of FIGS. 1 and 2.

In an implementation, shown in FIGS. 1-2, disrupter system 100 includes disrupter cannon 102, mount 104, lanyard 112, retainer 120, parachute 110, and lanyard 112. Lanyard 112 is coupled to disrupter cannon 102 and parachute 110. Retainer 120 includes tab 122 and body 130. Tab 122 includes hole 124 (e.g., passage) and opening 126. Opening 126 provides access to a cavity in tab 122. Body 130 includes opening 410, cavity 420, and lip 412 around opening 410. Opening 410 provides access to cavity 420.

Disrupter cannon 102 is positioned in mount 104. Lanyard 112 couples parachute 110 to disrupter cannon 102. Mount 104 and retainer 120 in FIGS. 1 and 2 may be positioned on the ground (e.g., earth, a surface).

Before disrupter cannon 102 is fired, parachute 110 is positioned in retainer 120. Retainer 120 is anchored (e.g., affixed, held immobile, held in place, secured, held firmly, fastened) to resist movement, as discussed in further detail below. Lanyard 112 couples disrupter cannon 102 to parachute 110; however, before disrupter cannon 102 is fired, lanyard 112 not exert a force on parachute 110 to extract parachute 110 from retainer 120.

After disrupter cannon 102 is fired, disrupter cannon 102 starts to move away from mount 104 in response to a force of recoil that acts on disrupter cannon 102. As disrupter cannon 102 moves away from mount 104, lanyard 112 begins to exert a force on parachute 110. The force on parachute 110 begins to pull parachute 110 from retainer 120. As discussed above, pulling parachute 110 from retainer 120 may begin deployment of (e.g., unfolding, extending, opening) parachute 110. As disrupter cannon 102 continues to move away from mount 104 and retainer 120, lanyard 112 pulls parachute 110 out of retainer 120.

Once parachute 110 is extracted (e.g., removed) from retainer 120, air resistance may operate on parachute 110 to deploy (e.g., open) or more fully deploy parachute 110. As parachute 110 opens, a force of air resistance operates on parachute 110 to arrest (e.g., slow down, stop) movement of parachute 110. Responsive to the air resistance, parachute 110 exerts a force on disrupter cannon 102 via lanyard 112. The force exerted by parachute 110 on disrupter cannon 102 deaccelerate movement of disrupter cannon 102. The deaccelerating force applied by parachute 110 on disrupter cannon 102 slows the movement of disrupter cannon 102. In time, the deaccelerating force applied by parachute 110 on disrupter cannon 102 stops movement of disrupter cannon 102. The force exerted by parachute 110 on disrupter cannon 102 may further orient disrupter cannon 102 so that the muzzle of the barrel of disrupter cannon 102 is pointing away from the explosive device and/or mount 104. As disrupter cannon 102 stops moving, it falls to the ground. Disrupter cannon 102 and parachute 110 may be retrieve and reused.

Parachute 110 may be reused by placing parachute 110 back into retainer 120. Parachute 110 may be folding, appropriately to facilitate deployment, prior to placing it into retainer 120.

Body 130 of retainer 120 may include cavity 420 into which parachute 110 may be placed prior to deployment. Opening 410 provides access to cavity 420. Opening 410 may be oriented in the direction that disrupter cannon 102 will pull parachute 110 from retainer 120 to facilitate extraction and deployment of parachute 110. Body 130 may be formed of a material that is flexible or inflexible. In implementation, body 130 is made of cloth. Cavity 420 may accept all, substantially all, or a portion of parachute 110. Opening 410 includes lip 412. Lip 412 may be a finished edge of the material that forms body 130. A finished edge facilitates movement of parachute 110 out of cavity 420. A finished edge may decrease interference of body 130 with parachute 110 as parachute 110 is pulled out of cavity 420 via opening 410.

Lip 412 may include a resilient material that holds opening 410 at least partially open to facilitate deployment of parachute 110. Lip 412 may include an elastic material that presses against parachute 110 to hold parachute 110 in cavity 420 until parachute 110 is pulled from cavity 420. Pressure of lip 412 against parachute 110 may help to deploy parachute 110. Pressure from lip 412 may begin to unfold and/or open parachute 110 as parachute 110 is pulled from retainer 120. For example, pressure of lip 412 against parachute 110 may at least partially unfold parachute 110 as parachute 110 passes by lip 412.

Cavity 420 may be large enough to hold parachute 110 in a folded position that includes a minimum amount of folding (e.g., in half) or in a position that requires more folding. An inner surface of cavity 420 may be formed of a material that facilitates movement of parachute 110 out of cavity 420. A material that facilitates movement of parachute 110 out of cavity 420 includes materials (e.g., silk, nylon) that present a lower coefficient of fiction to parachute 110 as parachute 110 moves against the inner surface of cavity 420.

Inner surface of cavity 420 may include portions that present lower coefficients of friction to parachute 110 and portions that present higher coefficient of friction to parachute 110 to aid in deployment of parachute 110. For example, a portion of the inner surface of cavity 420 may present a higher coefficient of friction to tug on parachute 110 to aid in unfolding parachute 110 as it exits cavity 420.

Tab 122 is coupled to body 130. Tab 122 holds (e.g., anchors) retainer 120 in position as parachute 110 is pulled from retainer 120. Tab 122 may hold (e.g., retain) retainer 120 by placing a weight (e.g., a rock) on top of tab 122. Tab 122 includes a cavity that may be accessed via opening 126. One or more objects (e.g., shot, lead) that have weight (e.g., mass) may be inserted into the cavity of tab 122 to hold retainer 120 in place. Opening 126 may be held closed to retain the one or more objects inside the cavity of tab 122. Tab 122 may further include hole 124 in the material of tab 122. A stake (e.g., pin, nail) may be positioned through hole 124 and attached to an object (e.g., the ground, earth) to hold retainer 120 in position.

The foregoing description discusses embodiments, which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The words "herein", "hereunder", "above", "below", and other word that refer to a location, whether specific or general, in the specification shall refer to any location in the specification.

What is claimed is:

1. A system for arresting movement of a disrupter cannon, the system comprising:
   a disrupter cannon;
   a parachute;
   a lanyard coupled to the disrupter cannon and the parachute; and
   a retainer, the retainer having a first cavity accessible via a first opening and a second cavity accessible via a second opening; wherein:
   prior to firing the disrupter cannon:
      the parachute is at least partially positioned in the first cavity;
      one or more objects having a mass are positioned at least one of in the second cavity and on a portion of the retainer;
      the retainer is positioned on a surface separate from the disrupter cannon; and
      the lanyard extends from the parachute to the disrupter cannon;
   movement of the disrupter cannon in response to a force of recoil applies a force on the lanyard that pulls the parachute from the first cavity via the first opening;
   once removed from the first cavity, a force of air resistance deploys the parachute thereby arresting movement of the disrupter cannon; and
   the mass of the one or more objects holds the retainer in place on the surface before, during, and after firing the disrupter cannon.

2. The system of claim 1 wherein the retainer further comprises a fastener for holding the second opening closed to retain the one or more objects inside the second cavity.

3. The system of claim 1 wherein an inner surface of the first cavity is formed of a material that presents a coefficient of friction that facilitates movement of the parachute out of the first cavity.

4. The system of claim 1 wherein the retainer is formed at least partially of a flexible material.

5. The system of claim 1 wherein:
the surface comprises a surface of an earth;
the disrupter cannon is positioned at a first location relative to the surface of the earth; and
the retainer is positioned at a second location on the surface of the earth separate from the first location.

6. A retainer for aiding deployment of a provided parachute of a provided disrupter cannon, the retainer comprising:
a body having a first cavity and a first opening, the first opening providing access to the first cavity; and
a tab coupled to the body, the tab having a second cavity and a second opening, the second opening providing access to the second cavity; wherein:
the parachute is position at least partially in the first cavity prior to firing the disrupter cannon;
one or more objects having a mass are positioned at least one of in the second cavity and on the tab;
movement of the disrupter cannon responsive to firing the disrupter cannon pulls the parachute from the first cavity via the first opening; and
the mass of the one or more objects holds the retainer in place on a surface before, during, and after firing the disrupter cannon.

7. The retainer of claim 6 wherein the tab further comprises a hole therethrough, wherein a stake is position through the hole to anchor the body to the surface to further hold the retainer in place.

8. The retainer of claim 6 further comprises a fastener for holding the second opening closed to retain the one or more objects inside the second cavity.

9. The retainer of claim 6 wherein an inner surface of the first cavity is formed of a material that presents a coefficient of friction that facilitates movement of the parachute out of the first cavity.

10. The retainer of claim 6 wherein at least one of the body and the tab is formed at least partially of a flexible material.

11. The retainer of claim 6 wherein the body further comprises a hole through a material of the body, the hole for driving a stake therethrough to further hold the retainer in place on the surface.

12. A retainer for aiding deployment of a provided parachute of a provided disrupter cannon, the retainer comprising:
a body, the body having a first cavity accessible via a first opening and a second cavity accessible via a second opening, the body formed at least partially of a flexible material; wherein:
prior to firing the disrupter cannon:
the parachute is positioned at least partially in the first cavity; and
the body is positioned on a surface, the body is separate from the disrupter cannon;
one or more objects having a mass are positioned at least one of in the second cavity and on a portion of the body;
movement of the disrupter cannon responsive to firing the disrupter cannon pulls the parachute from the first cavity via the first opening; and
the mass of the one or more objects holds the retainer in place on the surface before, during, and after firing the disrupter cannon.

13. The retainer of claim 12 wherein the body further comprises a lip around the first opening formed of the material that forms the body.

14. The retainer of claim 12 further comprises a fastener for holding the second opening closed to retain the one or more objects inside the second cavity.

15. The retainer of claim 12 wherein the body further comprises a hole through the material of the body, the hole for driving a stake therethrough to further hold the retainer in place on the surface.

16. The retainer of claim 12 wherein an inner surface of the first cavity is formed of a material that presents a coefficient of friction that facilitates movement of the parachute out of the first cavity.

17. The retainer of claim 12 wherein the material comprises cloth.

18. A retainer for aiding deployment of a provided parachute of a provided disrupter cannon, the retainer comprising:
a body, the body formed at least partially of a flexible material, the body having a cavity accessible via an opening and a hole through the material of the body; and
a stake; wherein:
prior to firing the disrupter cannon:
the parachute is positioned at least partially in the cavity;
the body is positioned on a surface, the body is separate from the disrupter cannon; and
the stake is positioned through the hole and couples to the surface;
movement of the disrupter cannon responsive to firing the disrupter cannon pulls the parachute from the cavity via the opening; and
the stake holds the retainer in place on the surface before, during, and after firing the disrupter cannon.

19. The retainer of claim 18 wherein the body further comprises a second cavity and a second opening, wherein:
the second opening providing access to the second cavity;
one or more objects having a mass are positioned in the second cavity; and
the mass of the one or more objects further holds the retainer in place on the surface before, during, and after firing the disrupter cannon.

20. The retainer of claim 18 wherein the body further comprises a lip around the opening formed of the material that forms the body.

21. The retainer of claim 18 wherein an inner surface of the cavity is formed of a material that presents a coefficient of friction that facilitates movement of the parachute out of the cavity.

22. The retainer of claim 18 wherein the material comprises cloth.

23. The retainer of claim 18 wherein:
the surface comprises a surface of an earth;
the disrupter cannon is positioned at a first location relative to the surface of the earth; and
the retainer is positioned at a second location on the surface of the earth separate from the first location.

* * * * *